US008733156B2

(12) United States Patent
Stilin et al.

(10) Patent No.: US 8,733,156 B2
(45) Date of Patent: May 27, 2014

(54) PMC LAMINATE EMBEDDED HYPOTUBE LATTICE

(75) Inventors: Nicholas D. Stilin, Higganum, CT (US); James Glaspey, Farmington, CT (US); Scott A. Smith, Plantsville, CT (US)

(73) Assignee: United Technologies Corporation, Hartford, CT (US)

( * ) Notice: Subject to any disclaimer, the term of this patent is extended or adjusted under 35 U.S.C. 154(b) by 173 days.

(21) Appl. No.: 13/549,602

(22) Filed: Jul. 16, 2012

(65) Prior Publication Data

US 2014/0013836 A1 Jan. 16, 2014

(51) Int. Cl.
*G01M 15/14* (2006.01)

(52) U.S. Cl.
USPC ........................................................ 73/112.01

(58) Field of Classification Search
CPC ........................................................ G01M 15/14
USPC ........................................ 73/112.01, 112.03
See application file for complete search history.

(56) References Cited

U.S. PATENT DOCUMENTS

| | | | | |
|---|---|---|---|---|
| 5,783,295 | A * | 7/1998 | Barnett et al. | 428/216 |
| 7,360,434 | B1 | 4/2008 | Hayes et al. | |
| 8,083,489 | B2 | 12/2011 | Viens et al. | |
| 2009/0311096 | A1 | 12/2009 | Herr et al. | |
| 2010/0021285 | A1 | 1/2010 | Rowe et al. | |
| 2012/0024071 | A1 | 2/2012 | Herrig et al. | |
| 2013/0299453 | A1 * | 11/2013 | Zimmerman et al. | 216/33 |

OTHER PUBLICATIONS

Patent Cooperation Treaty, International Search Report and Written Opinion, Aug. 12, 2013, 10 pages.

* cited by examiner

*Primary Examiner* — Eric S McCall
(74) *Attorney, Agent, or Firm* — Kinney & Lange, P.A.

(57) ABSTRACT

A gas turbine engine component such as a laminate airfoil having a static pressure transducer and having a plurality of structural fiber layers bonded with a polymer matrix composite. The transducer includes a lattice formed from a plurality of hypotubes aligned in a first direction and a plurality of reinforcing wires aligned substantially perpendicular to the hypotubes. The lattice is placed between at least some of the structural fiber layers prior to thermally processing into a cured polymer matrix laminate composite.

20 Claims, 6 Drawing Sheets

PMC LAMINATE EMBEDDED HYPOTUBE LATTICE

BACKGROUND

Instrumented flow path hardware for aerodynamic test engines typically include vanes or blades with trenches machined into airfoil surfaces for the routing of small diameter tubing for the transmission of static pressure from sensor to transducer.

Hardware is typically fabricated from high strength metallic materials to accommodate the geometric complexity of the trenching and the increased stresses due to removal of material. The design and fabrication of test hardware requires substantial resources in terms of manpower, schedule and cost.

In addition, the presence of small diameter tubing on the surfaces of airfoils and in the flow path alters the flow of air and affects the actual pressure being measured.

SUMMARY

A static pressure device including a hypotube lattice is incorporated into gas turbine engine components such as airfoils to measure surface pressure on the airfoils. A lattice is formed from a plurality of hypotubes aligned in a first direction and held in place with a plurality of reinforcing wires that are aligned essentially perpendicular to the hypotubes.

The lattice is embedded internally between layers of a laminate composite component such as an airfoil such that the first direction above is the radial direction of the airfoil. The airfoil pressure side or suction side or both may have a plurality of bundles of the lattice static pressure device.

DETAILED DESCRIPTION

The term "hypotube" is standard in industry and describes hollow metal tubes of very small diameter. Hypotubes are used in the medical industry and are produced primarily from 304 and 304L (low-carbon) welded stainless steel. 304 stainless steel has relatively low carbon content (0.08 percent maximum) and resists corrosion better than 302 stainless steel. Three different means for welding the tubes are used in the industry. Gas tungsten arc welding (GTAW) is the oldest method and is still widely used. Plasma welding is a variation on GTAW, and laser welding is the newest method. All are effective. Typical hypotubes have an outer diameter of about 0.032 inches (0.3 to about 0.4 mm). Wall thicknesses are about 0.375 mm.

Figure 1:
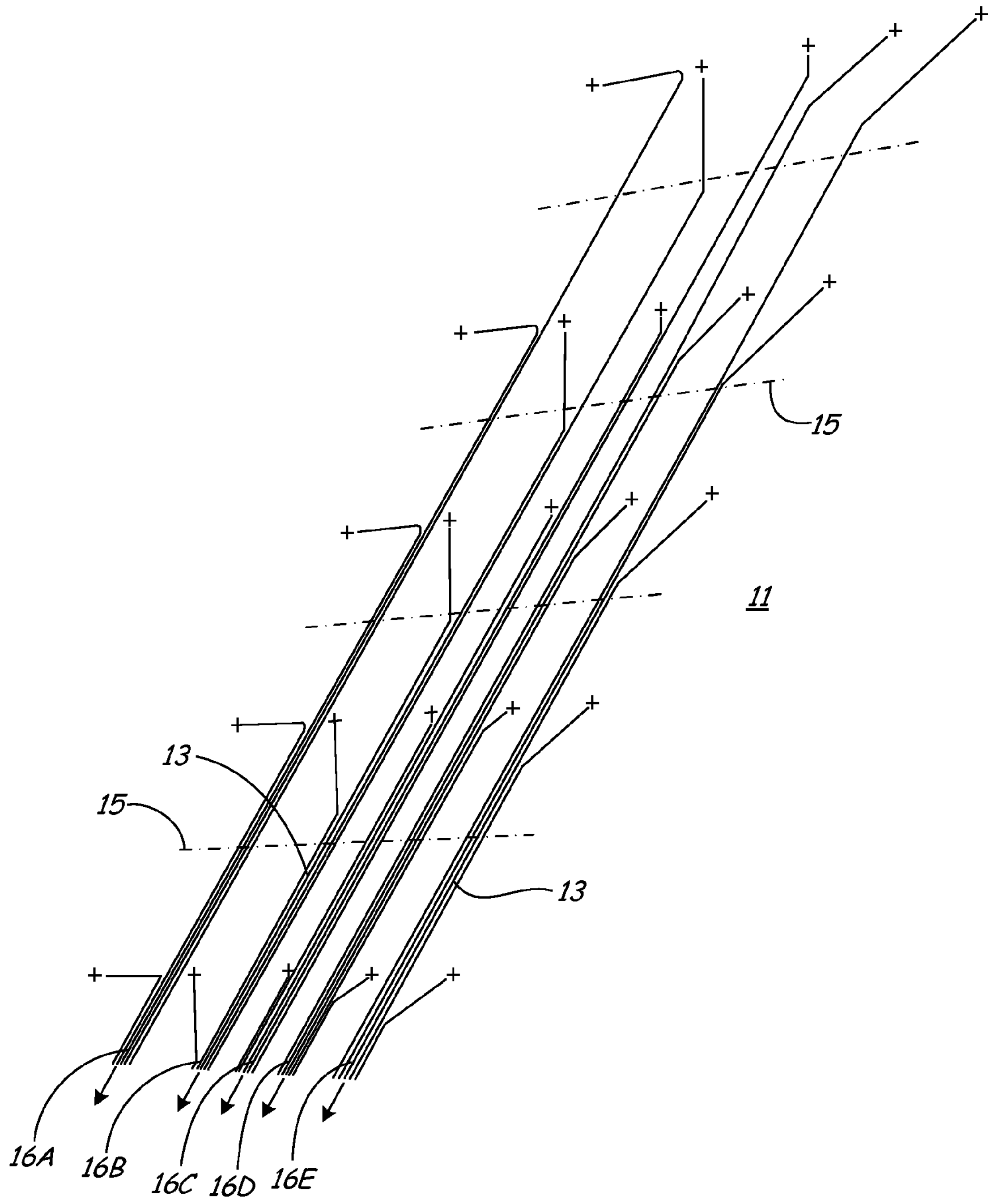
FIG. 1 is a perspective view of a hypotube lattice.

The hypotubes and wire lattice brazement or weldment 11 in FIG. 1 is formed from small diameter hypotubes 13 with crosswise reinforcing wires 15. Five bundles 16A-16E each contain five hypotubes 13 of different lengths. Inlet ends + from each bundle 16A-16E are located at a plurality of locations to provide a array of opening locations. FIG. 1 shows each of the five hypotubes with a length corresponding to a hypotube in all five bundles 16A-16E to present five axial or chord directed lines of openings +. The invention as depicted has 5 chordwise and 5 spanwise pressure sensing locations but the number of locations could be increased or decreased in either direction as required.

Figure 2:
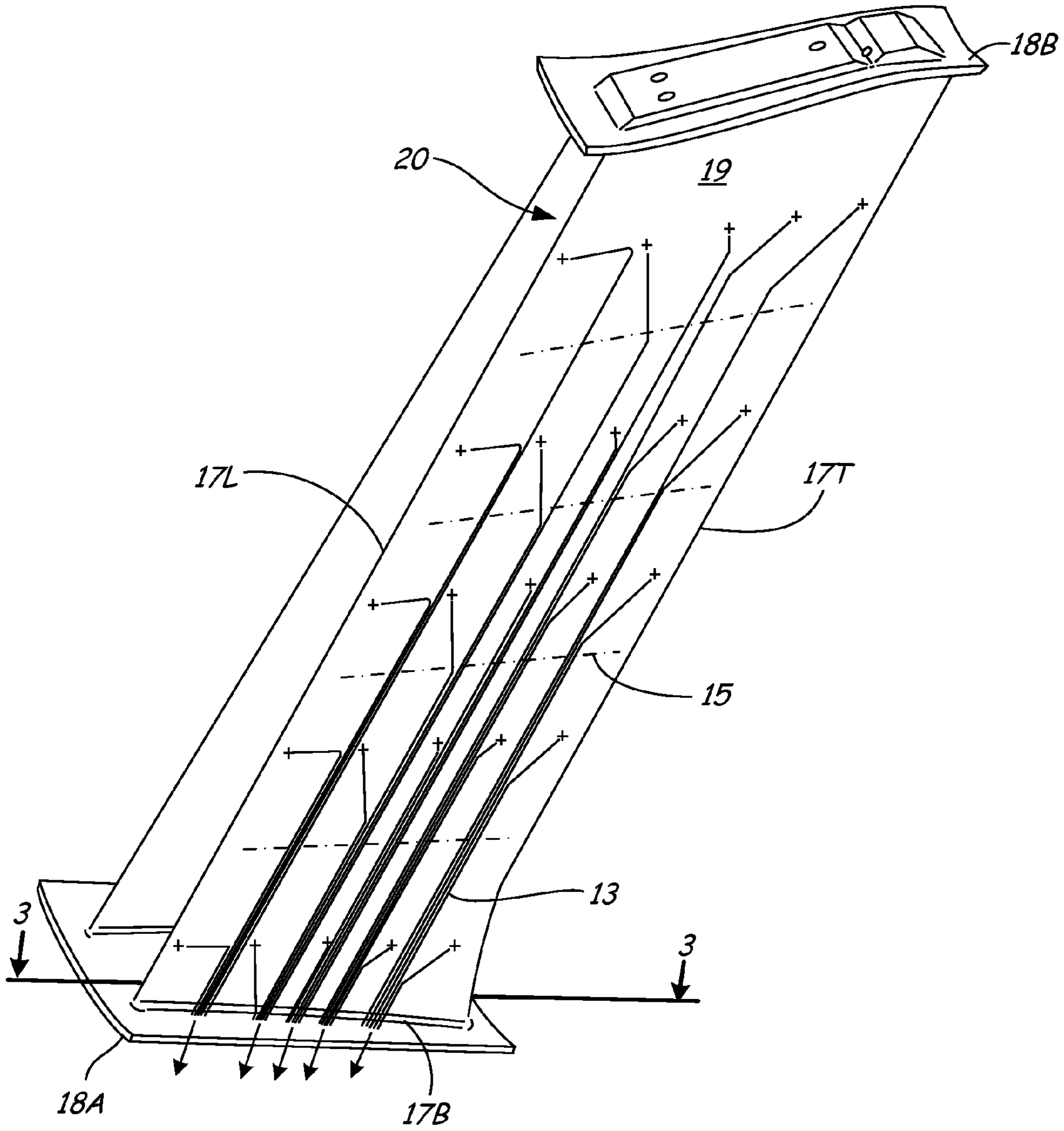
FIG. 2 is a perspective view of the hypotube lattice of FIG. 1 embedded in an airfoil.

Lattice 11 in FIG. 1 is laid-up in composite laminate airfoil 17 of FIG. 2. The tubes are typically sealed to prevent the intrusion of resin during the molding process. In FIG. 2, airfoil 17 is one of two vanes extending between base exit wall 18A and top endwall 18B. Airfoil 17 includes pressure surface 19 and suction surface 20, which extent in a chord wise (or axial) direction from leading edge 17L to trailing edge 17T and extend in a span wise (or radial) direction from base end wall 18A to tip end wall 18B. Inlet ends of hypotubes 13, shown by the +, take in pressure on pressure surface 19 of airfoil 17 and to exit ends at platform 17A of airfoil 17 shown by the arrows. In FIG. 2, inlet ends + provide pressure to hypotubes 13. FIG. 2 illustrates an airfoil in the form of a vane, but blades and other gas turbine engine components exposed to fluid pressure are equally suitable for the present invention. The invention may also apply to single vanes or blades or components having multiple vanes or blades connected together as a single component.

Figure 3:
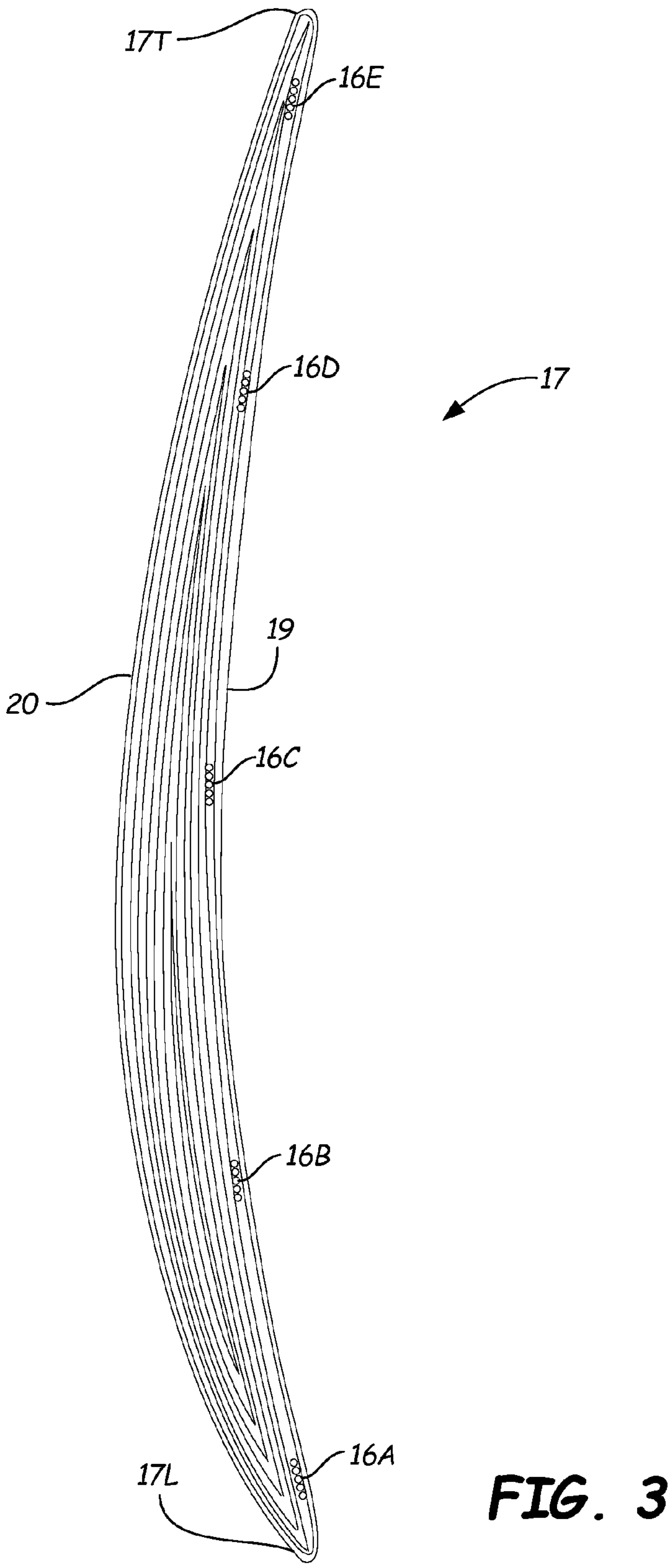
FIG. 3 is a section view of the airfoil of FIG. 2 taken along the line 3-3 of FIG. 2.

Drilling into the face of vane 17 connects the individual hypotubes 13 at inlets + to the flowfield to allow measurement of the fluid pressure field at various locations on pressure surface 19 of airfoil 17 at the bottom 17B of airfoil 17 in FIG. 3. Bundles 16A-16E of five hypotubes each are installed in the vane pressure side laminate 19. Airfoils have a pressure side 19 and a suction side 20. Radiography or witness marks of tubes 13 in the surface of the laminate show locations of tubes for drilling to openings +.

Figure 4:
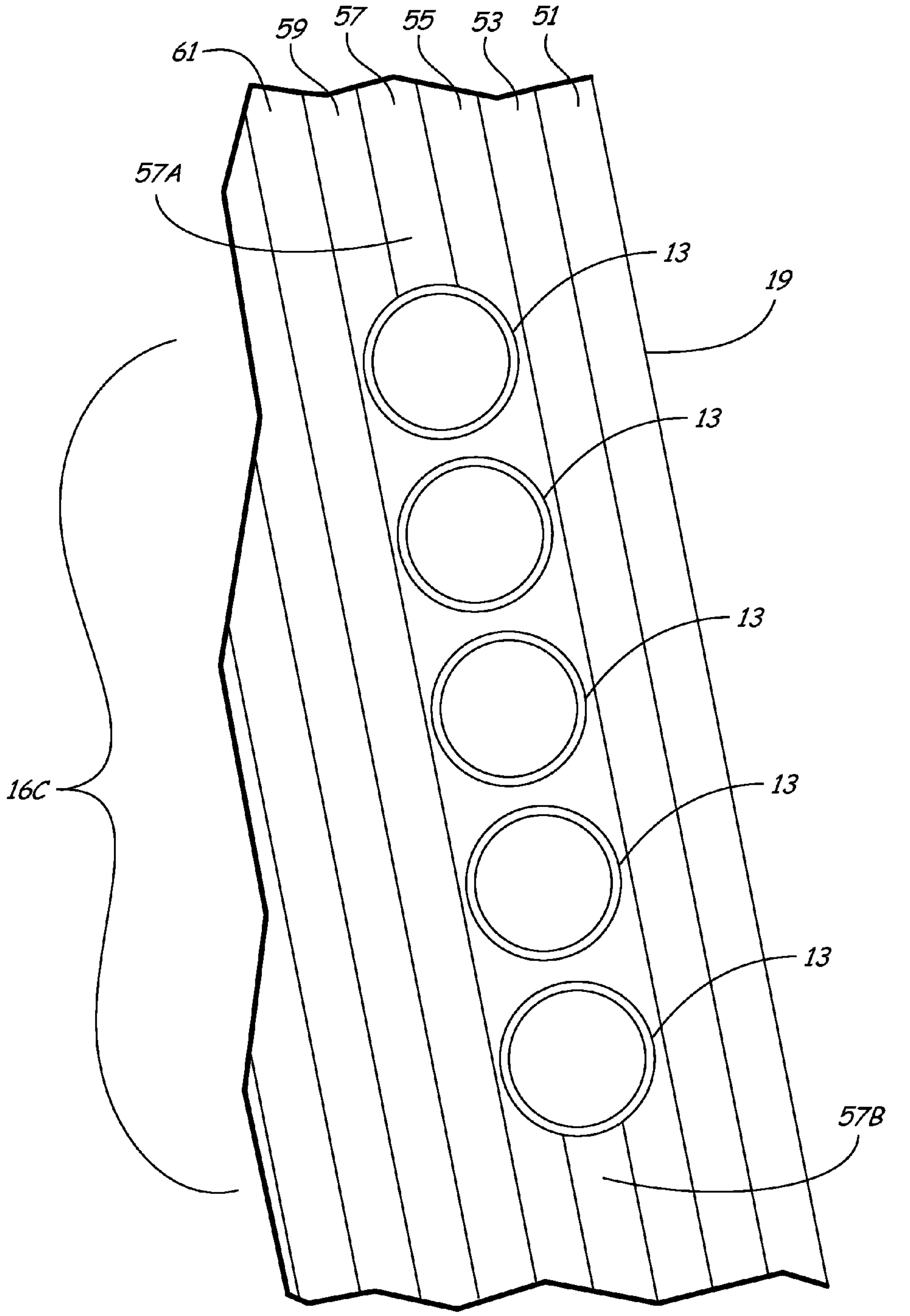
FIG. 4 is an enlarged view of a portion of the section view of FIG. 3.

FIG. 4 is an enlarged view of a portion of pressure side 19 of vane 17. Bundle 16A of hypotubes 13 is held in vane 17 between plies 51, 53, 55, 57, 59 and 61, with ply 57 being shown as segmented at 57*a* and 57*b* if the plies are small and close together. Otherwise no segmenting is necessary. Plies have been depicted as 0.012 inches (0.1 mm) thick, but the invention can accommodate a wide array of ply thicknesses. Bundle 16A contains five hypotubes identified above. It has been found to be effective in evaluating the pressure on surface 19 of vane 17 to provide a plurality of bundles 16A-16E as previously described with respect to FIG. 3.

Figure 5:
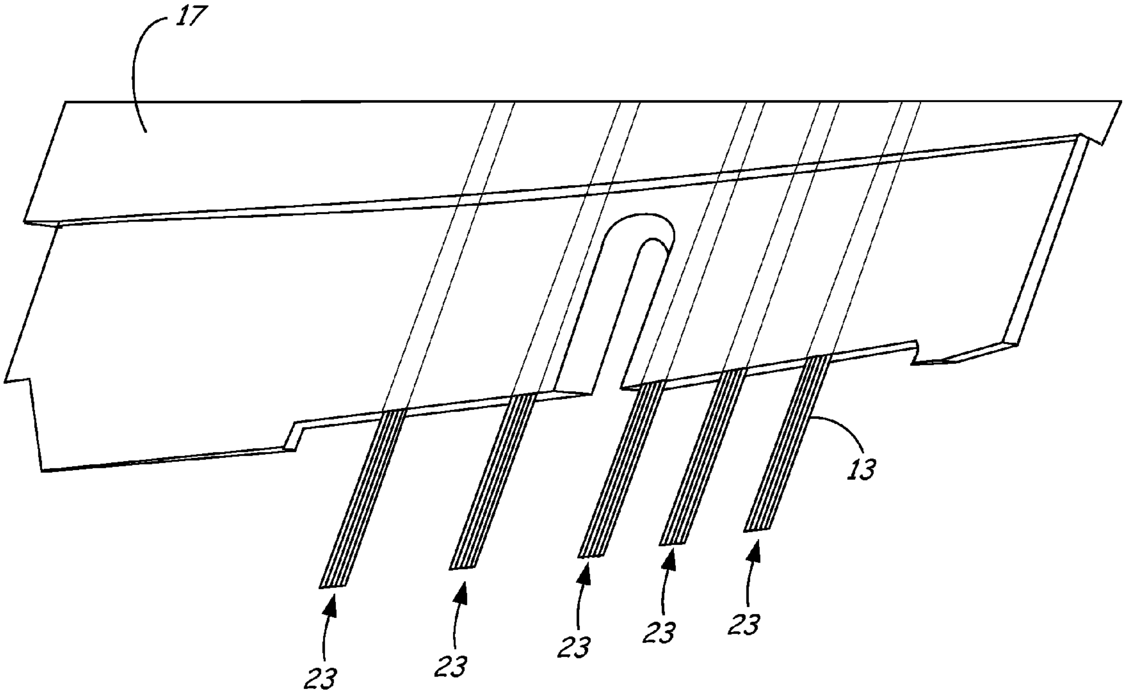
FIG. 5 is an enlarged view of the lower end of the lattice of FIG. 2
Figure 6:
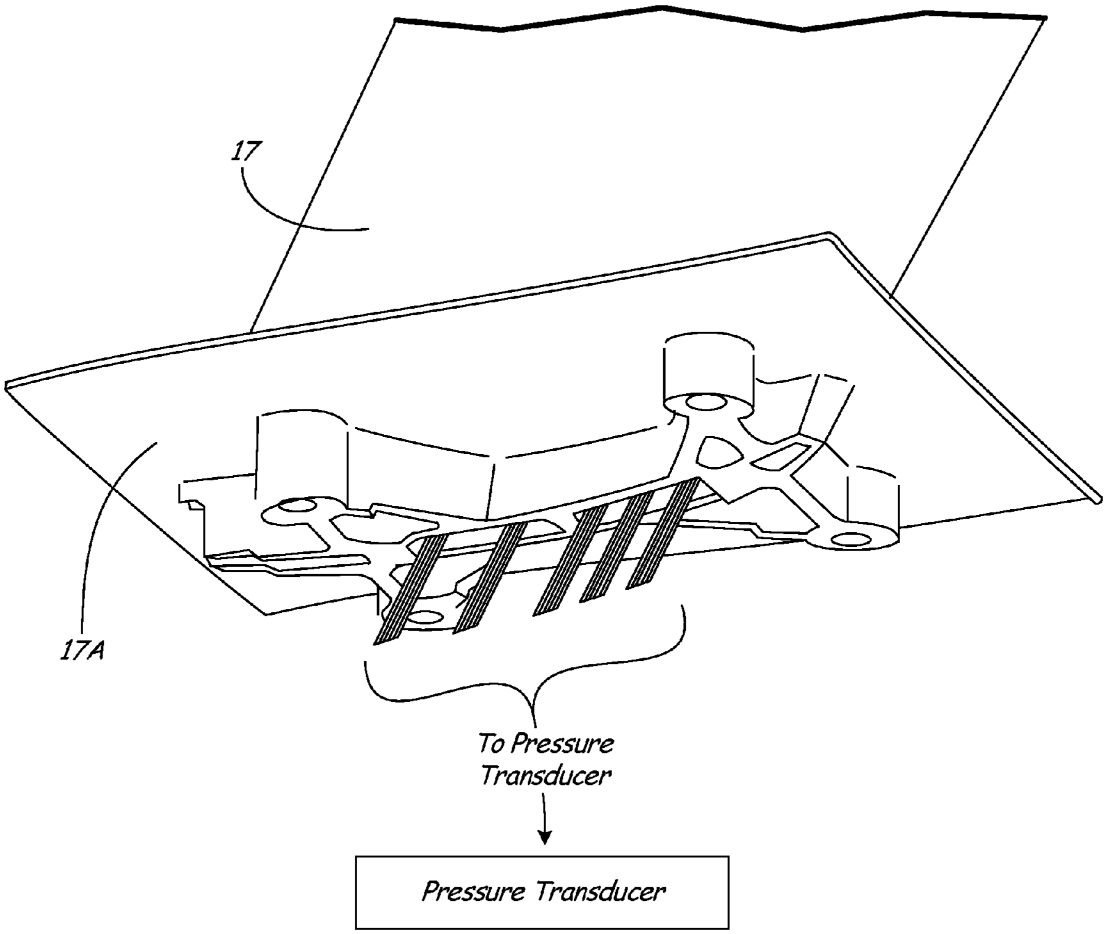
FIG. 6 is a further enlarged view of the lattice of FIG. 5.

The five bundles 16A-16E extend out bottom 17B of vane 17 in FIG. 5 and FIG. 6 and are connected to additional lengths of tubing that ultimately connect to electrical pressure transducers, of conventional design, not shown, where DC voltage is proportional to static pressure in tubes 13.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A component of a gas turbine engine, the component comprising:

a component body formed of a composite material; and a hypotube lattice formed from a plurality of hypotubes aligned in a first direction having a plurality of reinforcing wires aligned substantially perpendicular to the hypotubes, the lattice being embedded within the component body with inlet ends exposed to fluid pressure and outlet ends of the hypotube lattice extending from the component to permit connection to pressure transducers.

2. The component of claim 1, wherein the hypotubes have an outer diameter from about 0.3 to about 0.4 mm.

3. The component of claim 1, wherein the device is embedded internally between layers of a laminate composite airfoil and the first direction is the radial direction of the airfoil.

4. The component of claim 3, wherein a grid work of holes in the laminate composite airfoil provide access to the hypotubes static pressure values.

5. The component of claim 4, wherein the plurality of hypotubes join together at one end of the air foil for transfer of static pressure therein.

6. The component of claim 5, wherein the laminate airfoil is formed by providing structural fiber layers bonded with a polymer matrix composite.

7. The component of claim 6, wherein the airfoil has a pressure side and suction side and a plurality of bundles of hypotubes are inserted in an airfoil on the pressure side.

8. A gas turbine engine component, the component comprising:

a plurality of structural plies in polymeric matrix fiber layers bonded with a polymer matrix to form a laminate component; and a lattice formed from a plurality of hypotubes aligned in a first direction and a plurality of reinforcing wires aligned substantially perpendicular to the hypotubes, the lattice being placed between at least some of the structural fiber layers composing a polymer matrix laminate composite, the plurality of hypotubes having an inlet end and an exit end.

9. The component of claim 8, wherein the hypotubes have an outer diameter from about 0.3 to about 0.4 mm.

10. The component of claim 8, wherein a grid work of holes are made in the laminate component to provide access to the inlet ends of the hypotubes for transfer of static pressure therein.

11. The component of claim 10, wherein the plurality of hypotubes join together at one end of the airfoil for transfer of static pressure therein.

12. The component of claim 8, wherein the plurality of hypotubes comprises a plurality of bundles of hypotubes such that each bundle of hypotubes has hypotubes of different lengths to present a spaced array of openings on the component.

13. The component of claim 12, wherein the component has an airfoil pressure side and suction side and a plurality of bundles of hypotubes are inserted on the airfoil pressure or suction side or both sides.

14. A method of measuring static pressure on an airfoil, the method comprising:

positioning a plurality of hypotubes having an inlet end and an outlet end, the hypotubes being aligned in a first direction;

forming a lattice with a plurality of reinforcing wires aligned substantially perpendicular to the hypotubes, wherein the hypotubes produce a signal proportional to static pressure; and placing the lattice inside an airfoil and connecting the hypotubes to the surface of the airfoil.

15. The method of claim 14, wherein the lattice is embedded internally between layers of a laminate composite airfoil and the first direction is the radial direction of the airfoil.

16. The method of claim 15, wherein the hypotubes have an outer diameter from about 0.3 to about 0.4 mm.

17. The method of claim 14, wherein a grid work of holes are made in the laminate airfoil to provide access to the inlet ends of the hypotubes.

18. The method of claim 17, wherein the plurality of hypotubes join together at one end of the air foil for transfer of static pressure therein.

19. The method of claim 15, wherein the laminate composite airfoil is formed by providing structural fiber layers bonded with a polymer matrix composite.

20. The method of claim 19, wherein the airfoil has a pressure side and suction side and a plurality of bundles of hypotubes are inserted in an airfoil on the airfoil pressure side, suction side, or both sides.

* * * * *